United States Patent
Kang et al.

(10) Patent No.: US 7,726,149 B2
(45) Date of Patent: Jun. 1, 2010

(54) REFRIGERATOR

(75) Inventors: Sung-Hee Kang, Changwon-Shi (KR);
Deok-Hyun Youn, Anyang-Shi (KR);
Su-Won Lee, Changwon-Shi (KR);
Jong-Min Shin, Busan (KR);
Jung-Wook Bae, Jinhae-Shi (KR)

(73) Assignee: LG Electronics Inc., Seoul (KR)

( * ) Notice: Subject to any disclaimer, the term of this patent is extended or adjusted under 35 U.S.C. 154(b) by 108 days.

(21) Appl. No.: 11/797,314

(22) Filed: May 2, 2007

(65) Prior Publication Data
US 2007/0289321 A1    Dec. 20, 2007

Related U.S. Application Data

(63) Continuation of application No. PCT/KR2004/002795, filed on Nov. 2, 2004.

(51) Int. Cl.
*F25D 17/04*    (2006.01)
(52) U.S. Cl. .............. 62/408; 62/186; 62/411; 62/443
(58) Field of Classification Search .......... 62/156, 62/186, 265, 408, 411, 441, 443
See application file for complete search history.

(56) References Cited

U.S. PATENT DOCUMENTS 3,283,528 A * 11/1966 Palm et al. ............. 62/187
3,872,683 A * 3/1975 Blanton .................. 62/140
3,893,307 A * 7/1975 Jacobs ................... 62/150
6,848,264 B2 * 2/2005 Lee et al. ............... 62/178
7,007,496 B2 * 3/2006 Kim et al. .............. 62/285

FOREIGN PATENT DOCUMENTS

| CN | 1341836 A | 3/2002 |
| EP | 0 298 349 A2 | 1/1989 |
| EP | 0 651 216 A1 | 5/1995 |
| EP | 0 793 066 A1 | 9/1997 |
| EP | 1 111 317 B1 | 6/2001 |
| EP | 1 154 210 B1 | 11/2001 |
| KR | 10-0362612 B1 | 11/2002 |
| KR | 10-0389432 B1 | 6/2003 |

* cited by examiner

*Primary Examiner*—Melvin Jones
(74) *Attorney, Agent, or Firm*—Birch, Stewart, Kolasch & Birch, LLP

(57) ABSTRACT

The present invention discloses a refrigerator which can perform direct cooling of circulating cool air by natural convection in a freezing chamber (F) and a refrigerating chamber (R), and which can selectively perform indirect cooling of circulating cool air by forcible convection in the refrigerating chamber. It is like that, frost or condensed water formed in the refrigerating chamber (R) of the direct cooling type refrigerator does not Influence the inside of the refrigerating chamber. In addition, the refrigerator efficiently performs a defrosting operation of the refrigerating chamber (R), sanitarily performs a cooling operation, and maintains uniform cooling performance.

35 Claims, 11 Drawing Sheets

REFRIGERATOR

This application is a Continuation of copending PCT International Application No. PCT/KR2004/002795 filed on Nov. 2, 2004, which designated the United States, and on which priority is claimed under 35 U.S.C. § 120. The entire contents of the above document is hereby incorporated by reference.

TECHNICAL FIELD

The present invention relates to a refrigerator which can perform a freezing operation by naturally convecting cool air in a freezing chamber, and which can perform a refrigerating operation by naturally or forcibly convecting cool air in a refrigerating chamber.

BACKGROUND ART

In general, a refrigerator prevents deterioration and reduction of freshness of foods, by generating cool air by exchanging heat with cold refrigerants passing through a refrigeration cycle, and freezing or maintaining the foods at a low temperature by circulating the cool air in a freezing chamber and a refrigerating chamber. Therefore, the refrigerator stores various kinds of foods for an extended period of time.

Normally, the refrigerators are classified into direct cooling type refrigerators and indirect cooling type refrigerators. In the direct cooling type refrigerator, evaporators are installed on inner walls of a freezing chamber and a refrigerating chamber, and cool air generated around the evaporators is naturally convected to cool the freezing chamber and the refrigerating chamber. Conversely, in the indirect cooling type refrigerator, an evaporator is installed on an inner wall of a freezing chamber, a fan is installed on a cool air circulation passage, and cool air generated around the evaporator is forcibly blown by the fan to cool the freezing chamber and the refrigerating chamber.

FIG. 1 is a side-sectional view illustrating a conventional direct cooling type refrigerator.

Referring to FIG. 1, in the conventional direct cooling type refrigerator, a freezing chamber F and a refrigerating chamber R are formed in upper and lower portions of a refrigerator main body 2 having an outer casing 2a and inner casings 2b and 2c, and the front surface of the refrigerator main body 2 is opened. A freezing chamber door 4a and a refrigerating chamber door 4b are hinge-coupled to the front surface of the refrigerator main body 2 to be opened or closed. A refrigeration cycle including evaporators 10a and 10b are built in the inner walls of the inner casings 2b and 2c of the refrigerator main body 2.

The refrigeration cycle includes a compressor 6, a condenser 8, a capillary tube (not shown), and evaporators 10a and 10b, so that circulated refrigerants can be compressed, condensed, expanded and evaporated.

Here, the large parts of the evaporators 10a and 10b are closely adhered to the inner wall of the inner casing 2b of the freezing chamber F, and the other parts thereof are built in the inner wall of the inner casing 2c of the refrigerating chamber R with a predetermined gap. Temperature sensors (not shown) are built in the evaporators 10a and 10b. In a state where the evaporators 10a and 10b are built in between the outer casing 2a and the inner casings 2b and 2c, an insulation material 12 is foamed.

The conventional refrigerator includes a control unit (not shown). The control unit externally receives a set freezing temperature $Tf_0$ and a set refrigerating temperature $Tr_0$, receives temperature information of the evaporators 10a and 10b from the temperature sensors to form a judgment, and controls the operation of the compressor 6 according to the judgment.

On the other hand, a drain tube 14 for externally guiding condensed water formed on the inner casings 2b and 2c of the refrigerating chamber R is installed at the lower portion of the refrigerating chamber R, and a drain fan 16 for collecting the condensed water flowing through the drain tube 14 is built in the lower portion of the refrigerating chamber R.

The operation of the conventional refrigerator will now be explained. The operation of the compressor 6 is controlled according to the set freezing temperature $Tf_0$ and the set refrigerating temperature $Tr_0$ inputted from the control unit. As the compressor 6 is operated, the refrigerants are compressed, condensed, expanded and evaporated by the compressor 6, the condenser 8, the capillary tube and the evaporators 10a and 10b. Low temperature low pressure liquid refrigerants passing through the evaporators 10a and 10b exchange heat with air in the freezing chamber F and the refrigerating chamber R, to generate cool air. The cool air is naturally convected in the freezing chamber F and the refrigerating chamber R to maintain a low temperature.

While the refrigerating chamber R maintains a relatively higher inside temperature than the freezing chamber F, since the evaporator 10b is built in the inner wall of the inner casing 2c of the refrigerating chamber R, frost is generated on the surface of the inner casing 2c of the refrigerating chamber R.

When a defrosting operation for stopping the compressor 6 to remove the frost is performed, the frost is molten, runs down the surface of the inner casing 2c of the refrigerating chamber R, and is discharged to the drain fan 16 through the drain tube 14.

The conventional direct cooling type refrigerator reduces heat exchange efficiency due to the frost formed at the refrigerating chamber R. In addition, the frost formed at the refrigerating chamber R is molten to increase humidity, and the condensed water insanitarily contacts foods inside the refrigerator.

The cool air is only naturally convected in the freezing chamber F and the refrigerating chamber R of the conventional direct cooling type refrigerator. As a result, a large capacity refrigerator cannot be manufactured.

DISCLOSURE OF THE INVENTION

The present invention is achieved to solve the above problems. An object of the present invention is to provide a refrigerator which can directly cool a freezing chamber to maintain a uniform low temperature state, and which can directly cool a refrigerating chamber to prevent frost and condensed water from being formed at the refrigerating chamber.

Another object of the present invention is to provide a refrigerator which can form a cool air circulation passage having high insulation effects around an evaporator installed at a refrigerating chamber to prevent frost and condensed water from being formed at the refrigerating chamber.

Yet another object of the present invention is to provide a refrigerator having a direct cooling type freezing chamber and a refrigerating chamber which can easily selectively embody an indirect cooling type refrigerating chamber.

Yet another object of the present invention is to provide a refrigerator which can minimize cool air loss, by sucking relatively high temperature air circulated in a refrigerating chamber from the upper portion of the refrigerating chamber, heat-exchanging the air, and injecting relatively low temperature air from the upper to lower portion of the refrigerating chamber.

In order to achieve the above-described objects of the invention, there is provided a refrigerator, including: a refrigerator main body in which a freezing chamber and a refrigerating chamber are formed to be partitioned; a freezing chamber side evaporator installed at the freezing chamber, for directly cooling the freezing chamber; a refrigerating chamber side evaporator installed on the inner wall of the refrigerating chamber, for cooling the refrigerating chamber; a refrigeration cycle including a compressor, a condenser and an expansion means connected to the freezing chamber side evaporator and the refrigerating chamber side evaporator, and performing a cooling operation around the evaporators by circulating refrigerants; a duct being installed on the inner wall of the refrigerating chamber directly contacting the refrigerating chamber side evaporator to form a cool air circulation passage in the up/down direction, having a suction hole at its one end, and having a plurality of cool air distribution holes at one side of the suction hole for distributing cool air to the refrigerating chamber, an air blowing device installed at the suction hole of the duct, for blowing the air circulated in the refrigerating chamber to pass through the cool air circulation passage; and a control unit for naturally or forcibly convecting the cool air in the refrigerating chamber by controlling operations of various components including the compressor and the air blowing device.

Preferably, the freezing chamber side evaporator is built in a shelf partitioning spaces of the freezing chamber. More preferably, the refrigerating chamber side evaporator is built in to directly contact part of the inner wall of the refrigerating chamber, a cool air circulation groove is formed long in the up/down direction at the built-in part of the refrigerating chamber side evaporator on the inner wall of the refrigerating chamber, and the duct is installed at the cool air circulation groove to form the same plane surface with the inner wall of the refrigerating chamber.

Preferably, the suction hole is formed at the upper end of the duct, and the plurality of cool air distribution holes are formed at the lower portion of the suction hole at predetermined intervals, so that the cool air can flow from the upper to lower end of the cool air circulation passage, and the air blowing device is installed at the suction hole of the duct.

Preferably, a drain pipe is connected to the lower end of the duct, so that condensed water running down the cool air circulation passage can be externally guided and discharged.

Preferably, an insulation material is installed on the inside surface of the duct contacting the cool air circulation passage to prevent dew from being formed on the outside surface of the duct contacting the refrigerating chamber. Here, a thickness of the insulation material is reduced from the lower to upper end in order to obtain a predetermined flowing space in which the cool air can flow, even though frost is formed thick at the upper end of the inner wall of the refrigerating chamber on the cool air circulation passage, or the cool air circulation groove is inclined from the lower to upper end in order to obtain a predetermined flowing space in which the cool air can flow, even though frost is formed thick at the upper end of the inner wall of the refrigerating chamber on the cool air circulation passage.

Preferably, the cool air distribution holes of the duct are increased in size from the upper to lower end of the duct to uniformly distribute the cool air.

Preferably, the air blowing device includes a blast fan for blowing cool air, a motor, and a fan housing installed at the suction hole of the duct, the blast fan and the motor being built in the fan housing.

Preferably, space-obtaining protrusion units are protruded from the front end of the fan housing by a predetermined length, for obtaining a predetermined flowing space at the front end, and the length of the space-obtaining protrusion units ranges from 15 to 25% of the diameter of the blast fan. A space-obtaining cover is protruded from the front end of the fan housing by a predetermined length in order to obtain a predetermined flowing space at the front end, and a plurality of suction holes are formed on the space-obtaining cover. More preferably, the protrusion length of the space-obtaining cover ranges from 10 to 50% of the diameter of the blast fan.

When a temperature of the refrigerating chamber is over a maximum temperature of the set refrigerating temperature range, the control unit performs a refrigerating operation by operating the compressor and rotating the blast fan at a first rotary speed, and when the temperature of the refrigerating chamber is below a minimum temperature of the set refrigerating temperature range, the control unit performs a defrosting operation by stopping the compressor and rotating the blast fan at a second rotary speed higher than the first rotary speed.

According to another aspect of the present invention, a refrigerator includes: a refrigerator main body in which a freezing chamber and a refrigerating chamber are formed to be partitioned; a freezing chamber side evaporator installed at the freezing chamber, for directly cooling the freezing chamber; a refrigerating chamber side evaporator installed on the inner wall of the refrigerating chamber, for cooling the refrigerating chamber; a refrigeration cycle including a compressor, a condenser and an expansion means connected to the freezing chamber side evaporator and the refrigerating chamber side evaporator, and performing a cooling operation around the evaporators by circulating refrigerants; a cool air circulating means detachably installed to form a cool air circulation passage in the up/down direction on the inner wall of the refrigerating chamber directly contacting the refrigerating chamber side evaporator, for circulating cool air generated on the cool air circulation passage in the refrigerating chamber, a coupling means installed between the inner wall of the refrigerating chamber and the cool air circulating means, for structurally and electrically coupling the cool air circulating means to the inner wall of the refrigerating chamber; and a control unit for naturally or forcibly convecting the cool air in the refrigerating chamber by controlling operations of various components including the compressor and the cool air circulating means.

Preferably, the freezing chamber side evaporator is built in a shelf partitioning spaces of the freezing chamber, and the refrigerating chamber side evaporator is built in to directly contact the whole inner wall of the rear surface of the refrigerating chamber.

Preferably, the cool air circulating means includes: a duct being installed on the inner wall of the refrigerating chamber with a predetermined gap to form a cool air circulation passage, having a suction hole at its one end, and having a plurality of cool air distribution holes at one side of the suction hole to distribute the cool air to the refrigerating chamber; and an air blowing device installed at the suction hole of the duct, for blowing the air circulated in the refrigerating chamber to pass through the cool air circulation passage.

Preferably, the suction hole is formed at the upper end of the duct, and the plurality of cool air distribution holes are formed at the lower portion of the suction hole at predetermined intervals, so that the cool air can flow from the upper to lower end of the cool air circulation passage, and the air blowing device is installed at the suction hole of the duct.

More preferably, a drain pipe is connected to the lower end of the duct, so that condensed water running down the cool air circulation passage can be externally guided and discharged.

Preferably, an insulation material is installed on the inside surface of the duct contacting the cool air circulation passage to prevent dew from being formed on the outside surface of the duct contacting the refrigerating chamber. Here, a thickness of the insulation material is reduced from the lower to upper end in order to obtain a predetermined flowing space in which the cool air can flow, even though frost is formed thick at the upper end of the inner wall of the refrigerating chamber on the cool air circulation passage, or the inner wall of the rear surface of the refrigerating chamber is inclined from the lower to upper end in order to obtain a predetermined flowing space in which the cool air can flow, even though frost is formed thick at the upper end of the inner wall of the refrigerating chamber on the cool air circulation passage.

Preferably, the cool air distribution holes of the duct are increased in size from the upper to lower end of the duct to uniformly distribute the cool air.

Preferably, the air blowing device includes a blast fan for blowing cool air, a motor, and a fan housing installed at the suction hole of the duct, the blast fan and the motor being built in the fan housing.

Preferably, space-obtaining protrusion units are protruded from the front end of the fan housing by a predetermined length, for obtaining a predetermined flowing space at the front end, and the length of the space-obtaining protrusion units ranges from 15 to 25% of the diameter of the blast fan. A space-obtaining cover is protruded from the front end of the fan housing by a predetermined length in order to obtain a predetermined flowing space at the front end, and a plurality of suction holes are formed on the space-obtaining cover. More preferably, the protrusion length of the space-obtaining cover ranges from 10 to 50% of the diameter of the blast fan.

Preferably, the coupling means includes: connectors electrically connected between the blast fan and the motor and the control unit, respectively, for transmitting control signals and power to each other; and uneven units formed respectively at the contact portions of both ends of the inner wall of the refrigerating chamber and both ends of the duct, and structurally coupled to each other.

Preferably, the control unit selectively performs direct cooling control and indirect cooling control on various components by connection or disconnection of the connectors. When the connectors are not connected to each other, the control unit performs direct cooling control for controlling the compressor, and when the connectors are connected to each other, the control unit performs indirect cooling control for controlling the compressor and the blast fan.

More preferably, when a temperature of the refrigerating chamber is over a maximum temperature of the set temperature range during the indirect cooling control, the control unit performs a refrigerating operation by operating the compressor and rotating the blast fan at a first rotary speed, and when the temperature of the refrigerating chamber is below a minimum temperature of the set temperature range, the control unit performs a defrosting operation by stopping the compressor and rotating the blast fan at a second rotary speed higher than the first rotary speed.

BRIEF DESCRIPTION OF THE DRAWINGS

The present invention will become better understood with reference to the accompanying drawings which are given only by way of illustration and thus are not limitative of the present invention, wherein.

BEST MODE FOR CARRYING OUT THE INVENTION

A refrigerator in accordance with the preferred embodiments of the present invention will now be described in detail with reference to the accompanying drawings.

Figure 1:
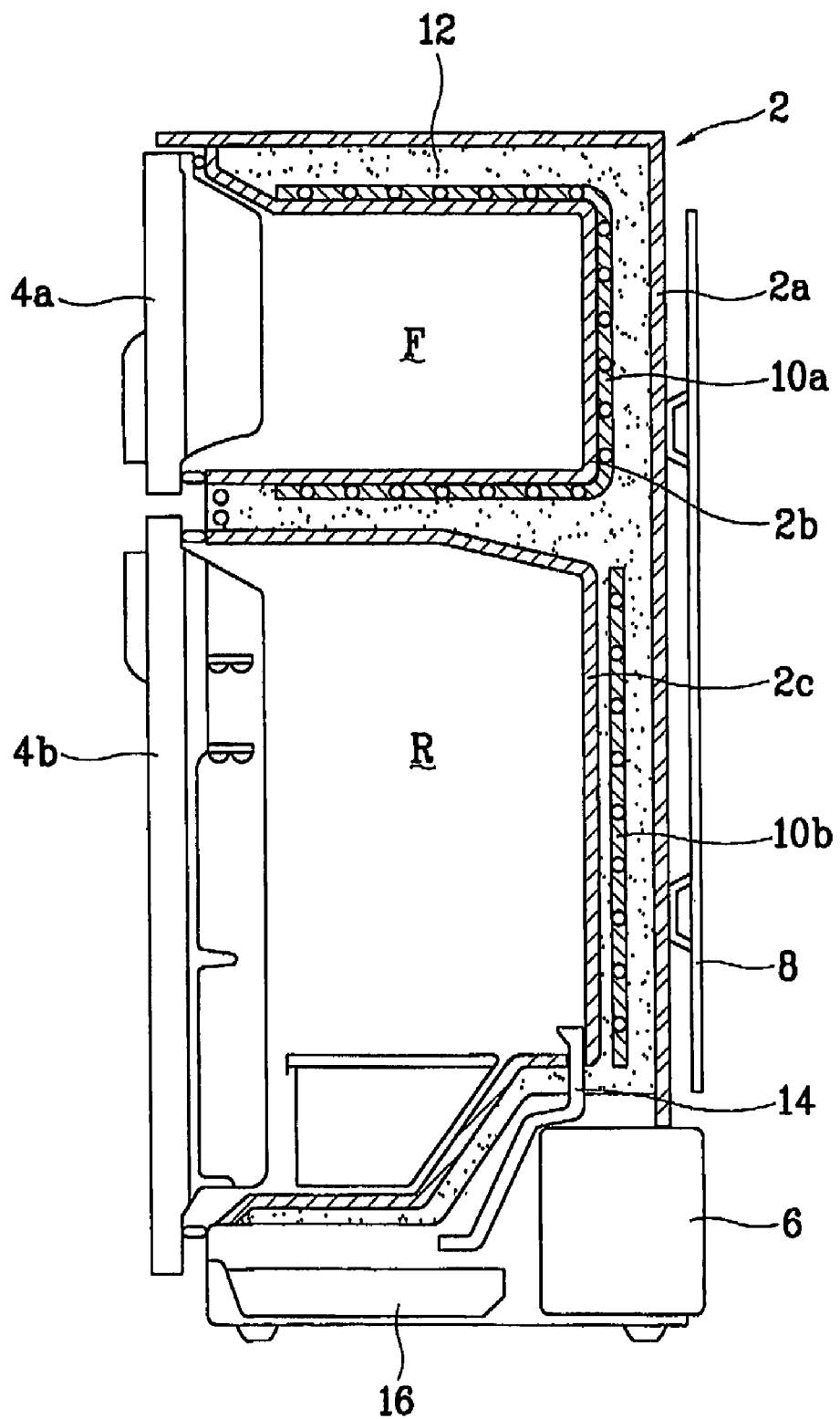
FIG. 1 is a side-sectional view illustrating a conventional direct cooling type refrigerator.
Figure 2:
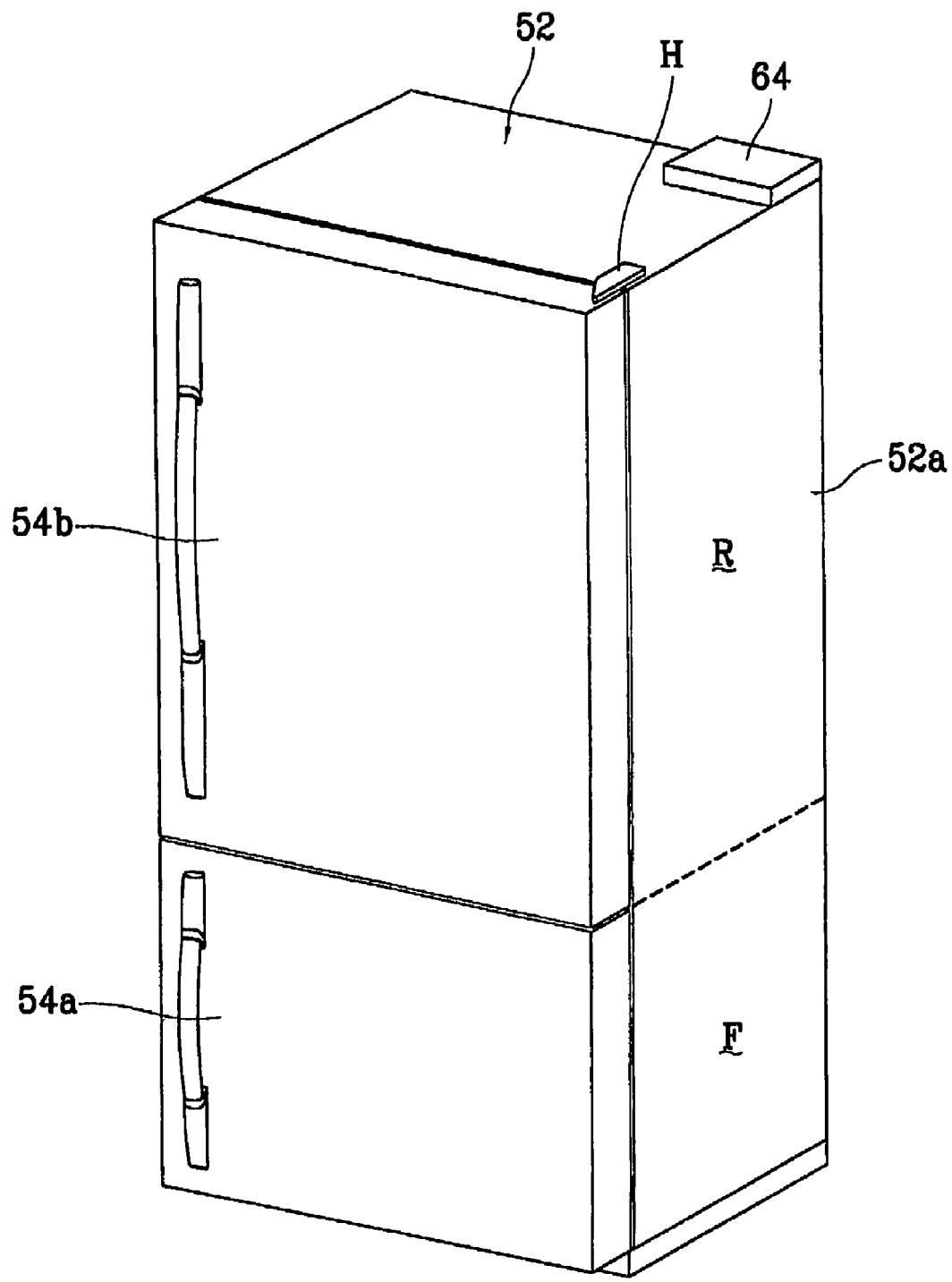
FIG. 2 is a perspective view illustrating a refrigerator in accordance with a first embodiment of the present invention.
Figure 3:
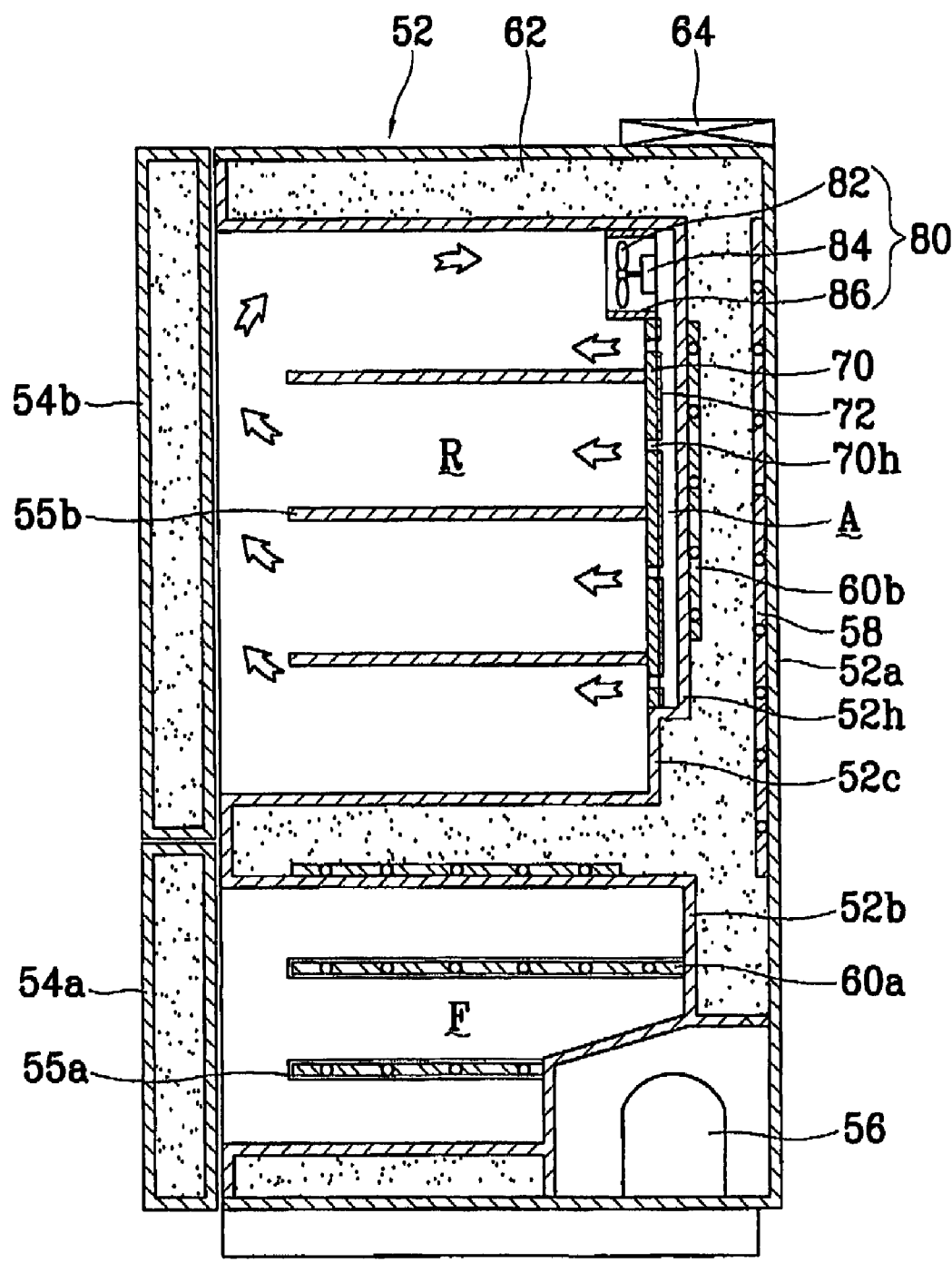
FIG. 3 is a side-sectional view illustrating the refrigerator in accordance with the first embodiment of the present invention.
Figure 4:
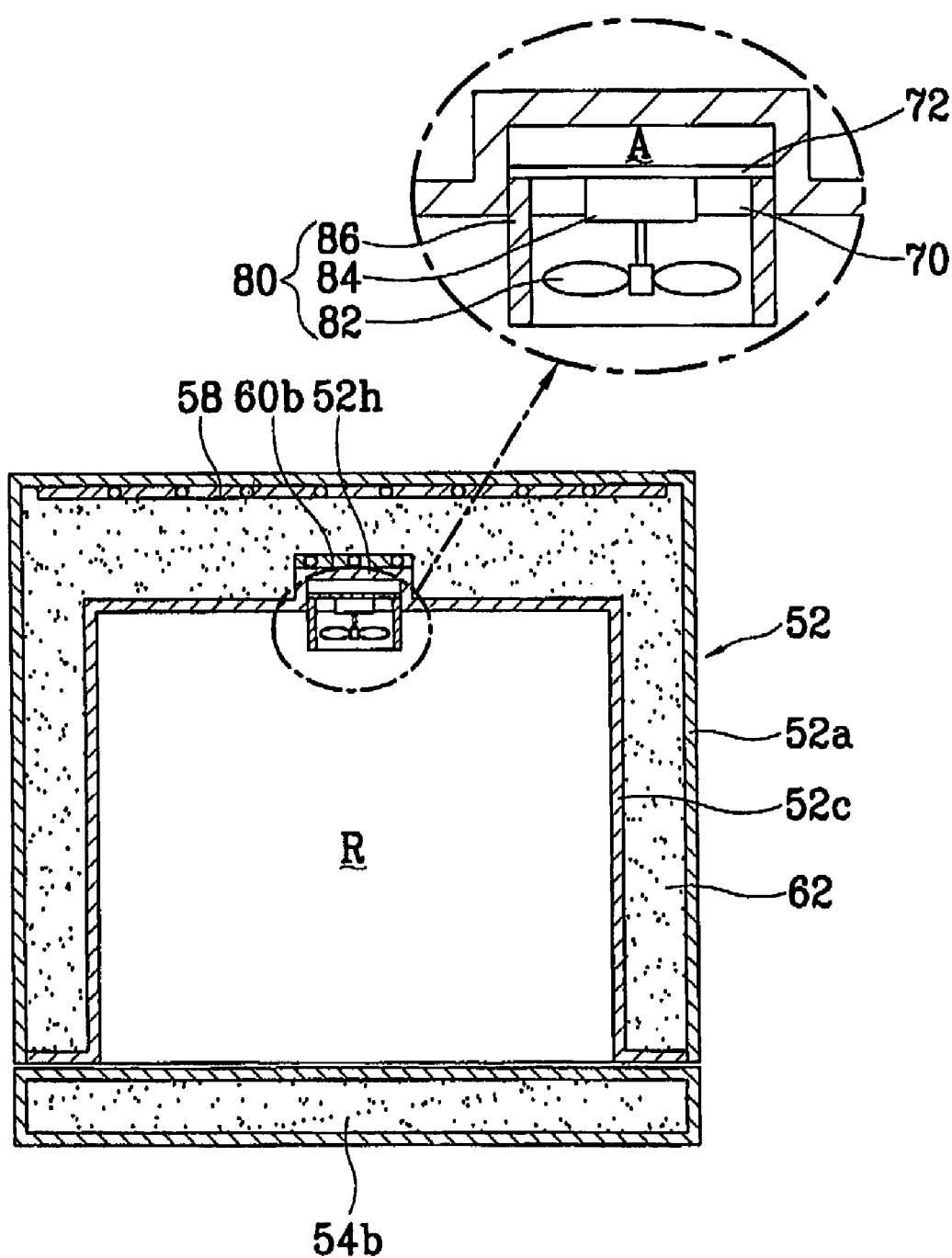
FIG. 4 is a plane-sectional view illustrating the refrigerator in accordance with the first embodiment of the present invention.
Figure 5:
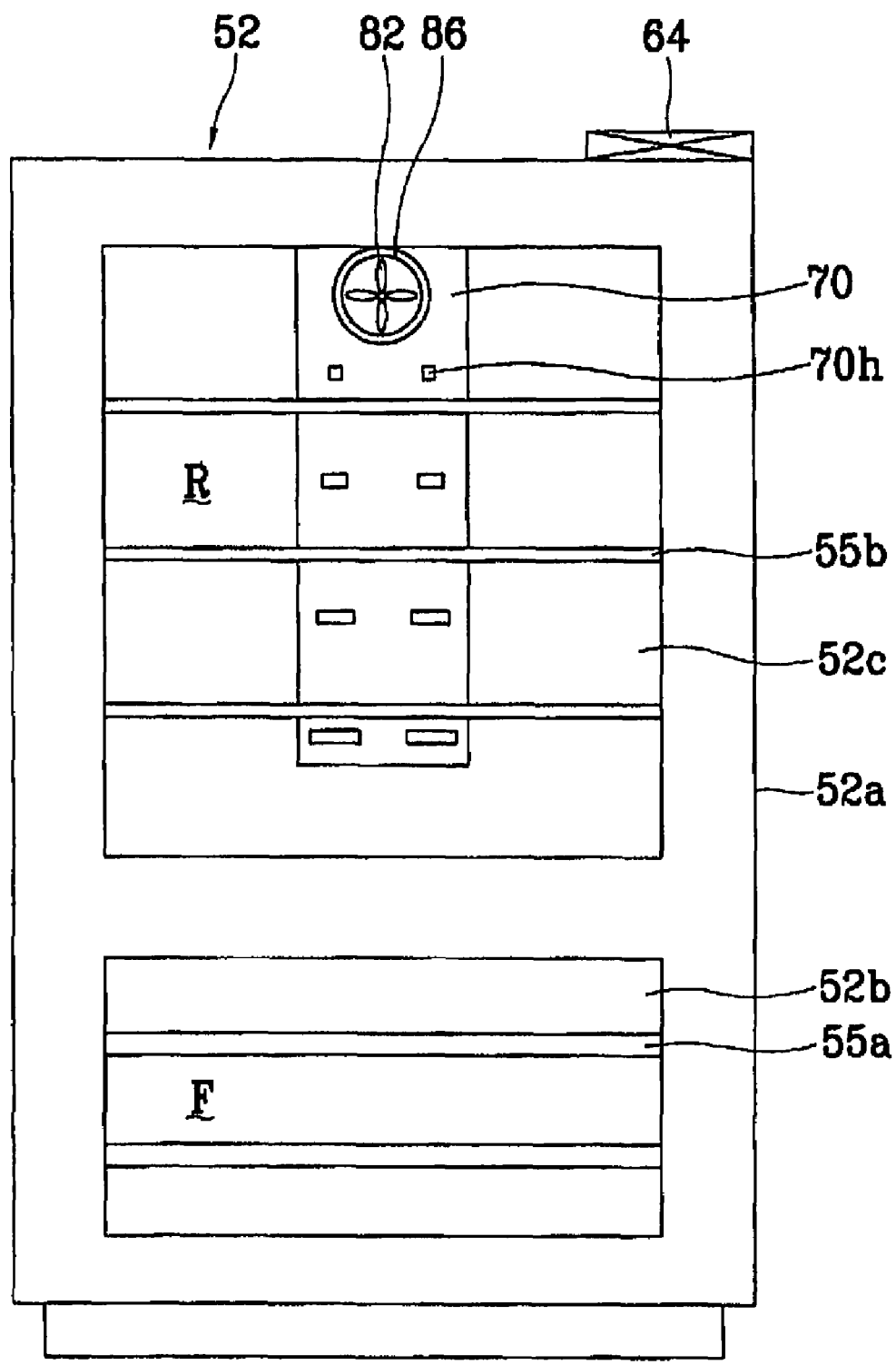
FIG. 5 is a front view illustrating a refrigerator main body of the refrigerator in accordance with the first embodiment of the present invention.

FIGS. 2 to 4 are a perspective view, a side-sectional view and a plane-sectional view respectively illustrating a refrigerator in accordance with a first embodiment of the present invention, and FIG. 5 is a front view illustrating a refrigerator main body of the refrigerator in accordance with the first embodiment of the present invention.

As illustrated in FIGS. 2 to 5, in the refrigerator of the first embodiment, a freezing chamber F and a refrigerating chamber R are formed at the lower and upper portions of a refrigerator main body 52 having its front surface opened, a freezing chamber door 54a and a refrigerating chamber door 54b are hinge-coupled (H) to the front surface of the refrigerator main body 52, and a refrigeration cycle including evaporators 60a and 60b is built in an inner wall of the refrigerator main body 52. Here, the freezing chamber F is cooled by direct cooling by naturally convecting cool air, and the refrigerating chamber R is cooled by indirect cooling by forcibly blowing cool air.

In detail, in a state where various components are built in between an outer casing 52a composing an outer appearance of the refrigerator main body 52 and inner casings 52b and 52c, an insulation material 62 is foamed, and the freezing chamber F and the refrigerating chamber R are installed inside the inner casings 52b and 52c.

A cool air circulation groove 52h is formed long in the up/down direction on the refrigerating chamber side inner casing 52c, for forming a cool air circulation passage A.

The evaporators 60a and 60b are formed by installing two plates having refrigerant tube grooves to overlap with each other. The evaporators 60a and 60b include a freezing chamber side evaporator 60a and a refrigerating chamber side evaporator 60b installed respectively at the freezing chamber F and the refrigerating chamber R. The freezing chamber side evaporator 60a and the refrigerating chamber side evaporator 60b are connected to each other so that refrigerants can flow therethrough.

The freezing chamber side evaporator 60a is built in a shelf allowing the user to put foods in the freezing chamber F and partitioning housing spaces, for directly cooling the freezing chamber F, and the refrigerating chamber side evaporator 60b is built in to be closely adhered to the inner wall of the refrigerating chamber side inner casing 52c. Preferably, the refrigerating chamber side evaporator 60b is adhered merely to the inner wall of the cool air circulation groove 52h of the refrigerating chamber R.

The evaporators 60a and 60b are connected to a compressor 56, a condenser 58, an expansion means (not shown) such as a capillary tube or an electronic expansion valve, for composing the refrigeration cycle by refrigerant circulation.

Temperature sensors (not shown) are built in one-side portions of the evaporators 60a and 60b. Each of the temperature sensors is connected to a control unit 64 for controlling operations of various components. The control unit 64 turns on/off power supplied to the compressor 56 according to temperature signals from the temperature sensors.

A duct 70 is mounted on the cool air circulation groove 52h to form the cool air circulation passage A, and an air blowing device 80 is installed on the duct 70, for injecting cool air from the upper to lower portion of the refrigerating chamber R. The air blowing device 80 is also connected to and controlled by the control unit 64.

Since the duct 70 is mounted on the cool air circulation groove 52h, the duct 70 does not interfere with a shelf 55b allowing the user to put foods in the refrigerating chamber R.

Here, the duct 70 is formed in a plate shape having a suction hole at its upper end, and having a plurality of cool air distribution holes 70h at the lower portion of the suction hole at predetermined intervals. Preferably, the cool air distribution holes 70h are increased in size from the upper to lower end of the duct 70, so that the cool air can be discharged from each position at the same flow amount even if the cool air flows along the cool air circulation passage A and causes a flow resistance.

In addition, when the cool air continuously flows along the cool air circulation passage A, the cool air actively exchanges heat with the refrigerating chamber side evaporator 60b, and thus has the lower temperature state. While the flow amount of the cool air is reduced from the upper to lower end of the duct 70, the cool air maintains the lower temperature state. Accordingly, the same size of cool air distribution holes 70h can also obtain the same cooling effects in each position.

Both ends of the duct 70 are inserted into the cool air circulation groove 52h. In a state where the duct 70 is mounted on the cool air circulation groove 52h, the front surface of the duct 70 forms the same plane surface with the inner wall of the refrigerating chamber side inner casing 52c, thereby preventing an inside capacity of the refrigerating chamber R from becoming smaller than that of the conventional direct cooling type refrigerating chamber.

A predetermined thickness of insulation material 72 is adhered to the rear surface of the duct 70. Even though frost or condensed water is formed on the surface of the cool air circulation groove 52h on which the refrigerating chamber side evaporator 60b is installed, the frost or condensed water is covered by the duct 70. Since the frost or condensed water is not formed on the outside surface of the duct 70 facing the refrigerating chamber R by insulation effects, the cooling operation is sanitarily performed.

Moreover, a drain pipe (not shown) for externally guiding the condensed water even if the frost formed on the surface of the cool air circulation groove 52h is molten and runs down, is connected to the lower end of the duct 70, and a drain fan (not shown) for collecting the condensed water is installed at the end of the drain pipe. Preferably, the drain fan can be taken out.

The air blowing device 80 includes a blast fan 82 for blowing the cool air circulated in the refrigerating chamber R to the cool air circulation passage A, a motor 84 for driving the blast fan 82, and a fan housing 86 in which the blast fan 82 and the motor 84 are installed. Here, the fan housing 86 is mounted on the suction hole of the duct 70, and the motor 84 is controlled to the control unit 64. The control unit 64 controls the operation of the blast fan 82 by turning on/off power supplied to the motor 84.

Preferably, the blast fan 82 is an axial fan for blowing cool air in the axial direction. The blast fan 82 guides the cool air along the cool air circulation passage A formed by the fan housing 86, the duct 70 and the cool air circulation groove 52h.

Preferably, an object is disposed at the front portion of the fan housing 86 with a predetermined gap for minimizing a suction flow resistance. More preferably, the gap is decided according to a diameter of the blast fan 82.

The control unit 64 controls the operations of the compressor 56 and the blast fan 82 by turning on/off power supplied to the compressor 56 and the motor 84, and also controls operations of the other components. When the control unit 64 externally receives a set freezing temperature $Tf_O$ and a set refrigerating temperature $Tr_O$, the control unit 64 controls each component so that temperatures measured by the temperature sensors can reach the set freezing temperature range and the set refrigerating temperature range. For example, the control unit 64 can control refrigerant flow and decompression by adjusting an opening value of the electronic expansion valve.

When the temperature of the refrigerating chamber R is above a maximum temperature $Tr_M$ of the set refrigerating temperature, the control unit 64 performs the refrigerating operation by operating the compressor 56 and rotating the blast fan 82 at a first rotary speed.

However, when the temperature of the refrigerating chamber R is below a minimum temperature $Tr_m$ of the set refrigerating temperature, the control unit 64 performs a defrosting operation for melting the frost formed on the surface of the refrigerating chamber side evaporator 60b, by stopping the compressor 56 so that relatively high temperature refrigerants can pass through the refrigerating chamber side evaporator 60b, and by rotating the blast fan 82 at a second rotary speed higher than the first rotary speed so that relatively high temperature air can be circulated.

Figure 6A:
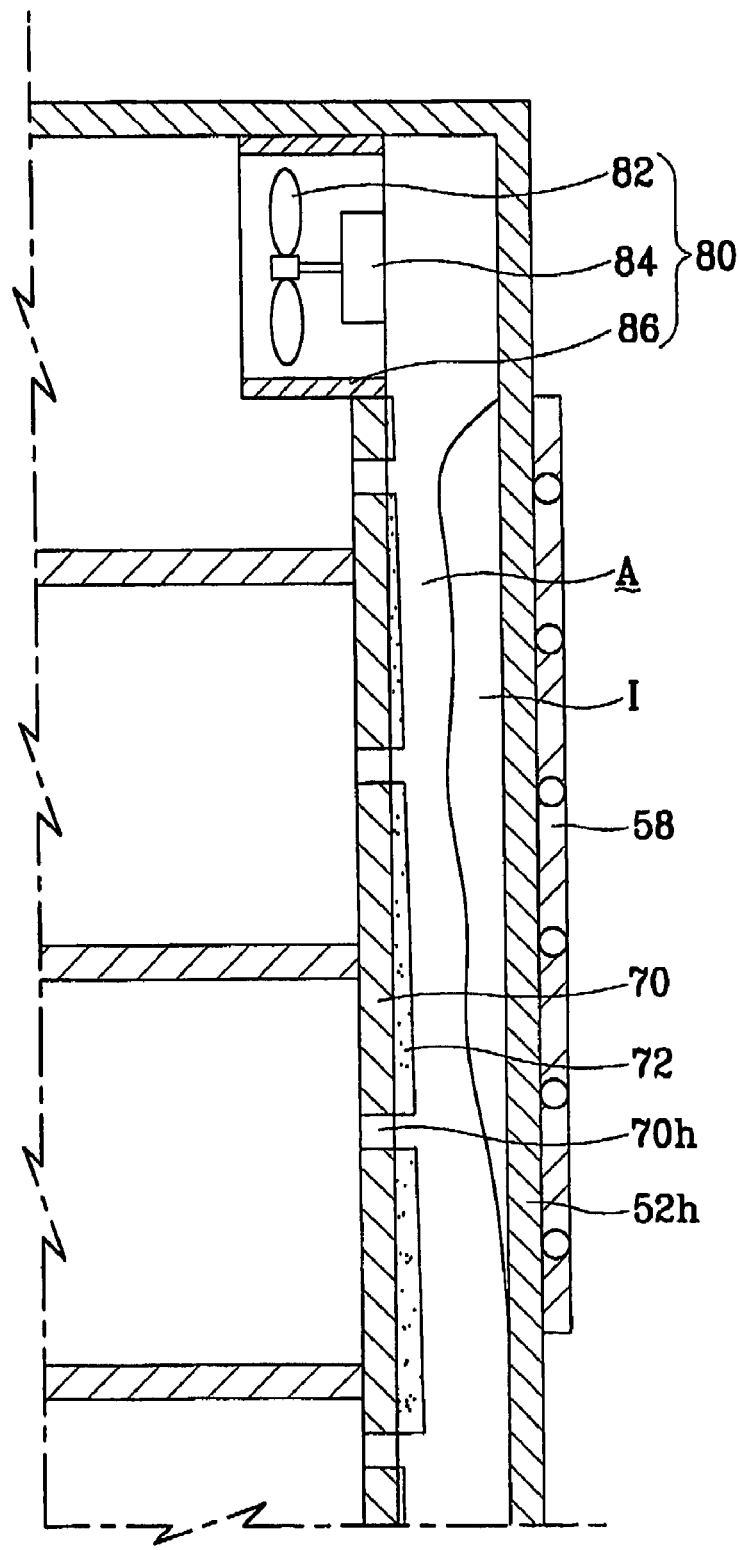
FIGS. 6a and 6b are side-sectional views illustrating first and second examples of an insulation material-adhered structure that can be applied to the refrigerator in accordance with the first embodiment of the present invention.
Figure 6B:
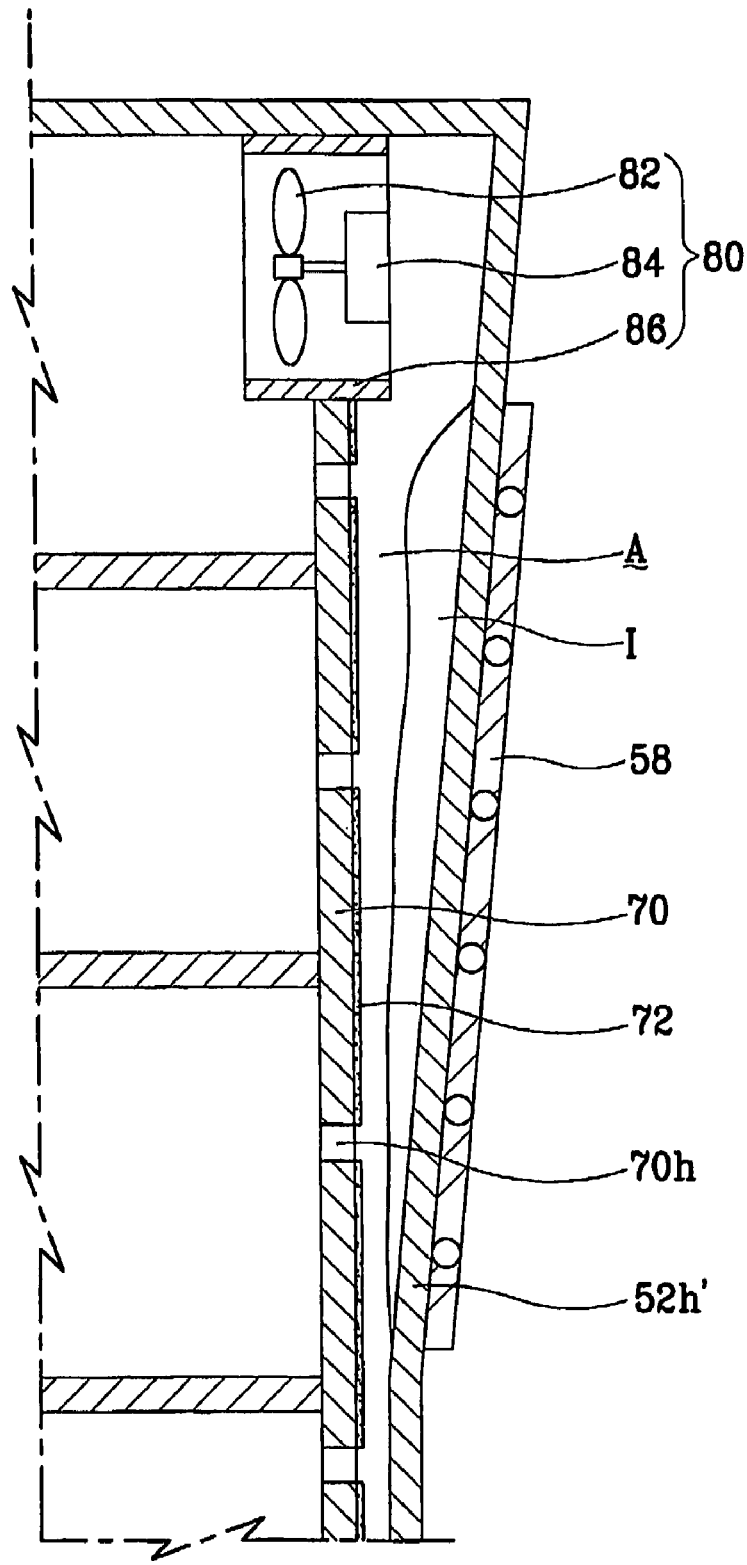

FIGS. 6a and 6b are side-sectional views illustrating first and second examples of an insulation material-adhered structure that can be applied to the refrigerator in accordance with the first embodiment of the present invention.

Frost is seriously formed on the cool air circulation passage A directly contacting the refrigerating chamber side evaporator 60b in the refrigerator that embodies indirect cooling of forcibly blowing cool air by adhering the duct 70 to the direct cooling type refrigerating chamber R.

In detail, a lot of frost is formed on the cool air circulation passage A adjacent to the suction hole of the duct 70. The air circulated in the refrigerating chamber R is sucked through the suction hole of the duct 70, and contacts the cool air circulation groove 52h directly contacting the refrigerating chamber side evaporator 60b, so that moisture of the air can form the frost on the surface of the cool air circulation groove 52h. Accordingly, the frost is formed thicker at the upper portion of the cool air circulation groove 52h. Even if the frost is formed on the cool air circulation groove 52h, various structures can be embodied to obtain the cool air flowing space.

As a first example, as shown in FIG. 6a, the duct 70 and the cool air circulation groove 52h are vertically parallel to each other, and an insulation material 72' reduced in thickness from the lower to upper end is adhered to the inside surface of the duct 70. Therefore, the cool air circulation passage A is larger in the upper end than the lower end. Even if frost I is formed at the upper end of the cool air circulation passage A, a predetermined flowing space for the cool air is obtained to prevent reduction of cooling efficiency.

Generally, even if the frost I is formed on the cool air circulation passage A, the thickness of the frost I is maximally 5 mm, and thus the thickness of the upper portion of the insulation material 72' is formed smaller than the thickness of the lower portion thereof by about 5 mm.

As a second example, as depicted in FIG. 6b, the duct 70 is vertically formed, the cool air circulation groove 52h is inclined from the lower to upper end, and the insulation material 72 is adhered to the inside surface of the duct 70 at a uniform thickness. Identically to the first example, the cool air circulation passage A is larger in the upper end than the lower end. Even if frost is formed at the upper end of the cool air circulation passage A, a predetermined flowing space for the cool air is obtained to prevent reduction of cooling efficiency.

Figure 7A:
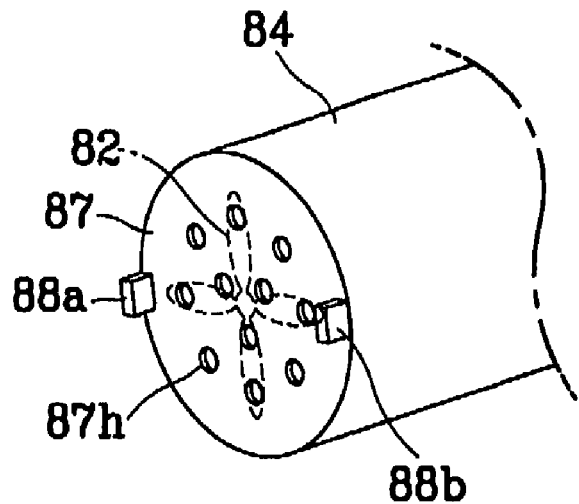
FIGS. 7a and 7b are perspective views illustrating first and second examples of an air blowing device that can be applied to the refrigerator in accordance with the first embodiment of the present invention.
Figure 7B:
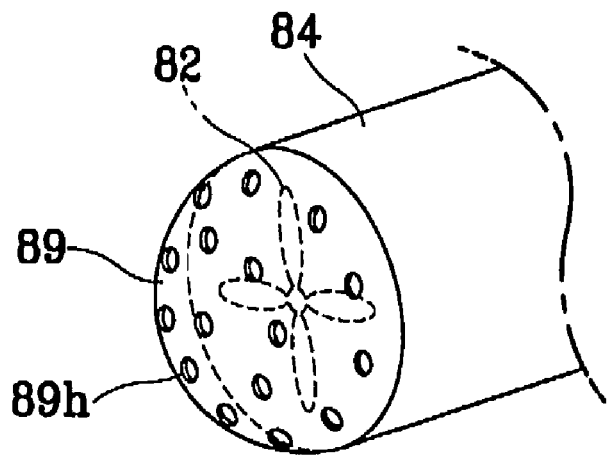

FIGS. 7a and 7b are perspective views illustrating first and second examples of the air blowing device that can be applied to the refrigerator in accordance with the first embodiment of the present invention.

The cool air circulated in the refrigerating chamber R is sucked to the cool air circulation passage A directly contacting the refrigerating chamber side evaporator 60b in the refrigerator that embodies indirect cooling of forcibly blowing the cool air by adhering the duct 70 to the direct cooling type refrigerating chamber R. In order to prevent the flow amount from being reduced due to the flow resistance of the suction hole of the duct 70, the air blowing device can be embodied in various forms, for obtaining a predetermined flowing space at the front portions of the suction hole of the duct 70 and the blast fan 82.

As a first example, as illustrated in FIG. 7a, a pair of space-obtaining protrusion units 88a and 88b are protruded from the cover 87 vertical to the front end of the fan housing 84 in the horizontal direction by a predetermined length, and a plurality of suction holes 87h are formed on the cover 87. The length of the space-obtaining protrusion units 88a and 88b ranges from 15 to 25% of the diameter of the blast fan 82. The space-obtaining protrusion units 88a and 88b obtain a flowing space, so that a resistance object such as food cannot be put in front of the suction hole of the duct 70.

Here, when the flowing space is wide in front of the suction hole of the duct 70, the flow resistance can be reduced. However, even if the length of the space-obtaining protrusion units 88a and 88b exceeds 30% of the diameter of the blast fan 82 to obtain the flowing space, the flow resistance is not additionally reduced.

As a second example, as shown in FIG. 7b, a space-obtaining cover 89 is protruded from the front surface of the fan housing 84 by a predetermined length. The space-obtaining cover 89 is formed in a hemispherical shape or a similar convex shape, and a plurality of suction holes 89h are formed thereon. The protrusion length of the space-obtaining cover 89 ranges from 10 to 50% of the diameter of the blast fan 82. Also, the space-obtaining cover 89 obtains a flowing space in front of the suction hole of the duct 70.

Figure 8:
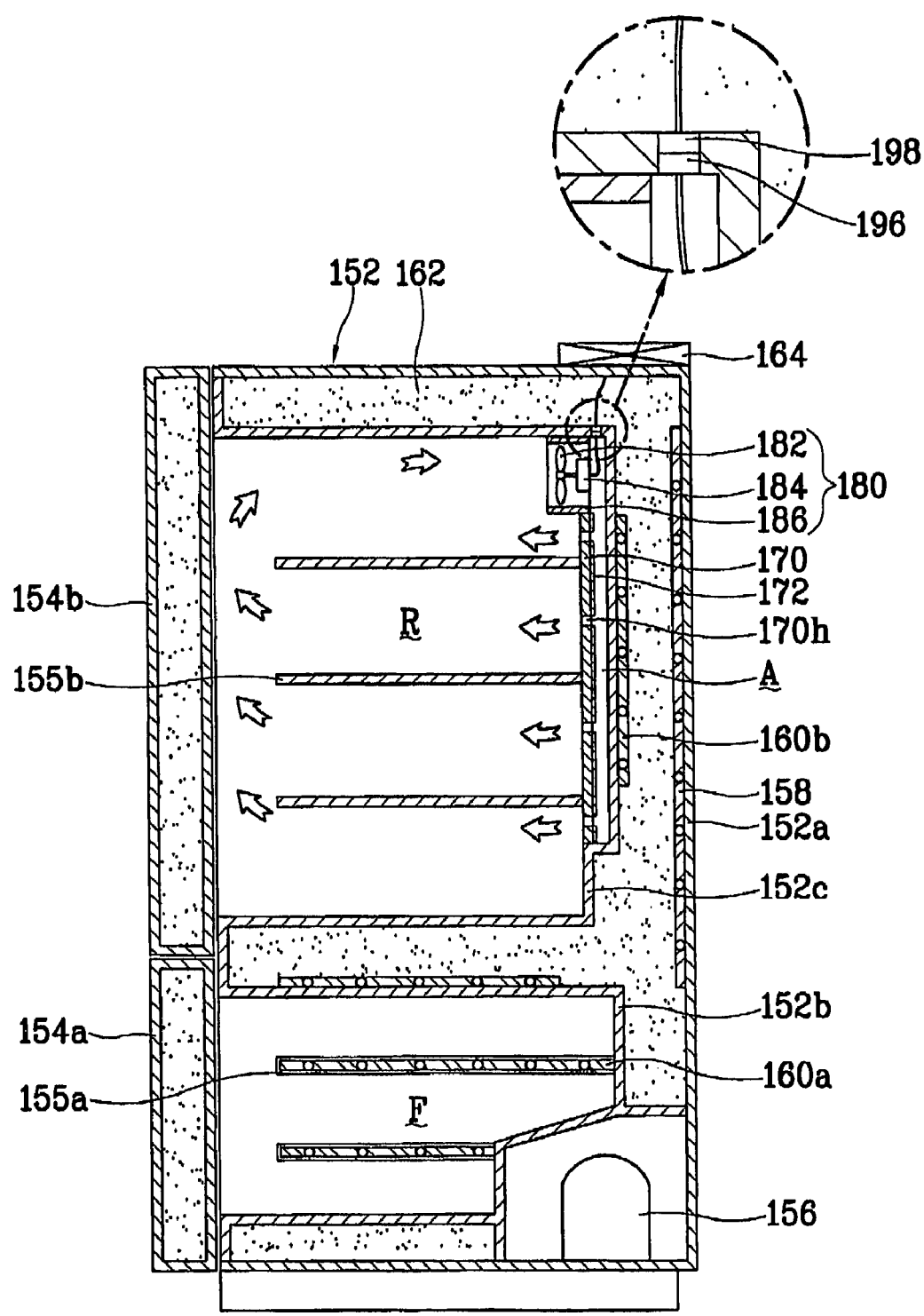
FIG. 8 is a side-sectional view illustrating a refrigerator in accordance with a second embodiment of the present invention.
Figure 9:
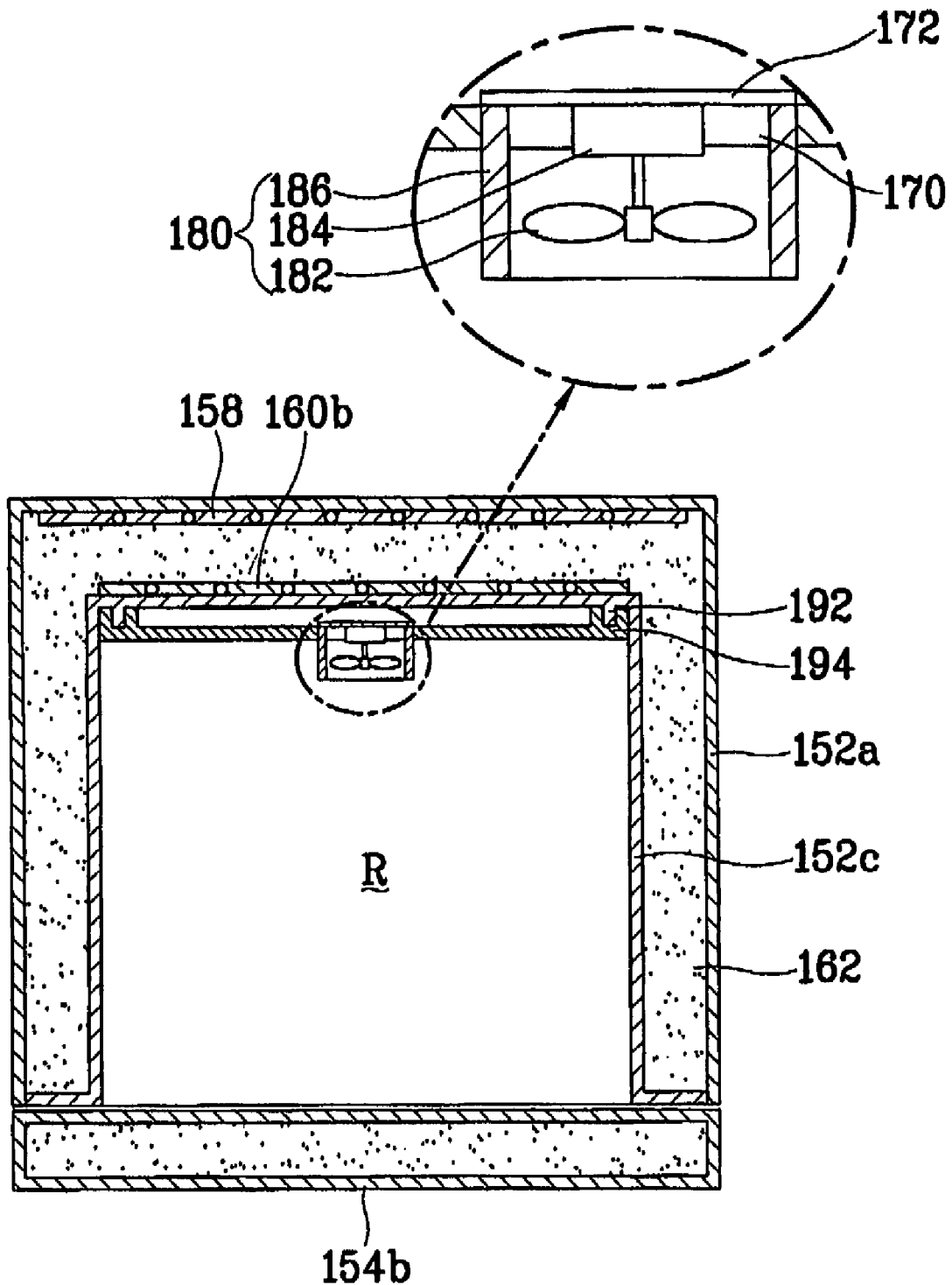
FIG. 9 is a plane-sectional view illustrating the refrigerator in accordance with the first embodiment of the present invention.
Figure 10:
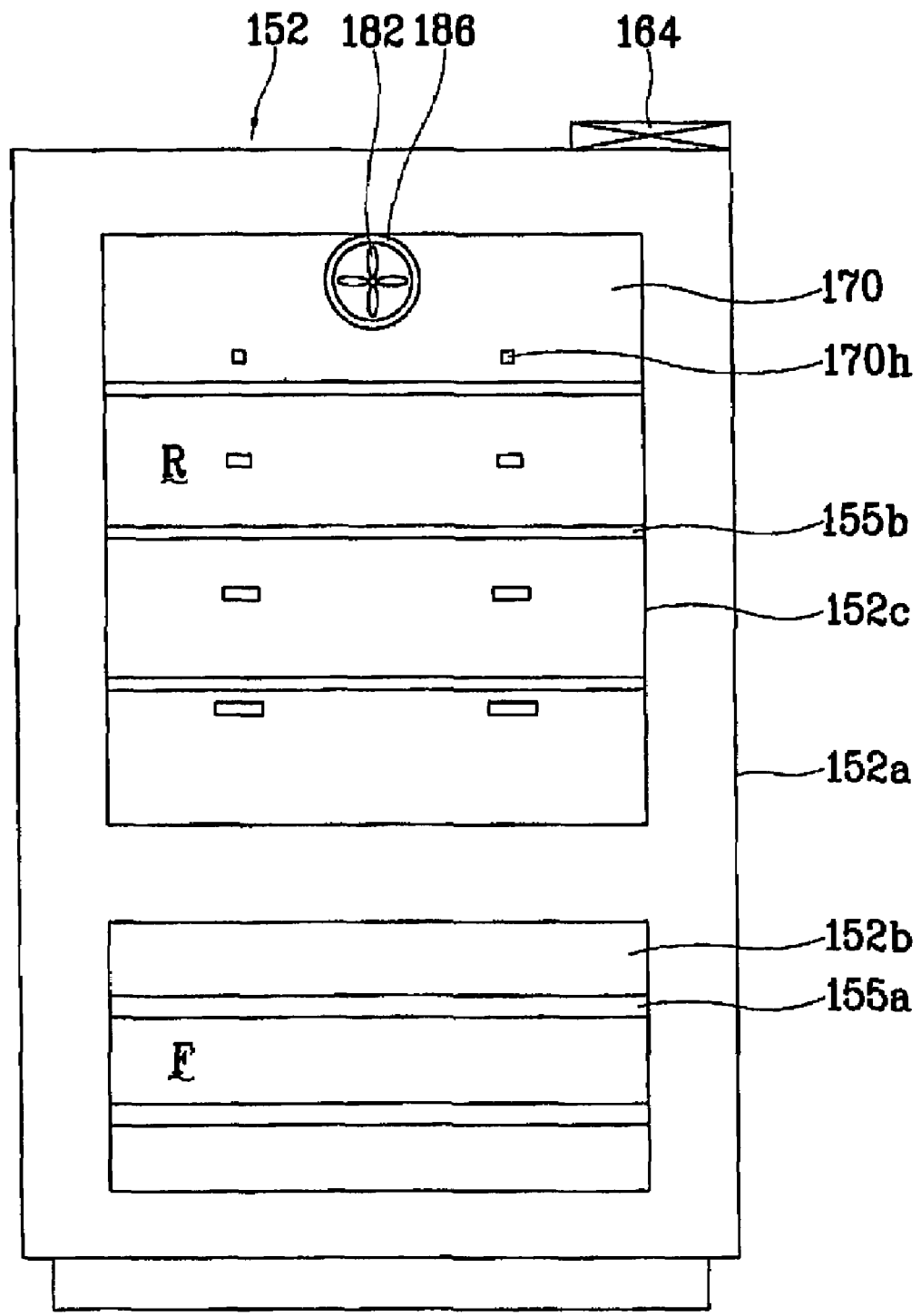
FIG. 10 is a front view illustrating a refrigerator main body of the refrigerator in accordance with the second embodiment of the present invention.

FIGS. 8 and 9 are a side-sectional view and a plane-sectional view respectively illustrating a refrigerator in accordance with a second embodiment of the present invention, and FIG. 10 is a front view illustrating a refrigerator main body of the refrigerator in accordance with the second embodiment of the present invention.

Referring to FIGS. 8 and 9, a refrigerating chamber R and a freezing chamber F are formed at the upper and lower portions of a refrigerator main body 152, and a refrigeration cycle including evaporators 160a and 160b, a compressor 156, a condenser 158, an expansion means (not shown) such as a capillary tube or an electronic expansion valve is built in the inner wall of the refrigerator main body 152, for cooling the freezing chamber F and the refrigerating chamber R by direct cooling. Here, a cool air circulating means can be selectively installed in the refrigerating chamber R by a structural coupling means and an electrical coupling means, for cooling the refrigerating chamber R by indirect cooling.

In detail, in a state where various components are built in between an outer casing 152a composing an outer appearance of the refrigerator main body 152 and inner casings 152b and 152c, an insulation material 162 is foamed, and the cool air circulating means is installed on one entire surface of the refrigerating chamber side inner casing 152c, for forming a cool air circulation passage A.

The evaporators 160a and 160b include a freezing chamber side evaporator 160a and a refrigerating chamber side evaporator 160b for flowing refrigerants through each other. The freezing chamber side evaporator 160a is built in a freezing chamber side shelf 155a for directly cooling the freezing chamber F, and the refrigerating chamber side evaporator 160b is built in to be closely adhered to one side inner wall of the inner casing 152 of the refrigerating chamber R.

Preferably, temperature sensors (not shown) are built in one-side portions of the evaporators 160a and 160b. Each of the temperature sensors is connected to a control unit 164 for controlling operations of various components. The control unit 164 controls the operation of the compressor 156 by turning on/off power supplied to the compressor 156 according to temperature signals from the temperature sensors.

The cool air circulating means includes a duct 170 installed on the whole inner wall of the refrigerating chamber R with a predetermined gap, for forming the cool air circulation passage A on one entire surface of the inner wall of the refrigerating chamber R to which the refrigerating chamber side evaporator 160b is adhered, and an air blowing device 180 for blowing the cool air circulated in the refrigerating chamber R to the cool air circulation passage A, thereby injecting the cool air from the upper to lower portion of the refrigerating chamber R. Also, the air blowing device 180 is selectively connected to and controlled by the control unit 164.

In a state where the duct 170 is mounted on the inner wall of the refrigerating chamber R which the refrigerating chamber side evaporator 160b directly contacts, even if a shelf 155b allowing the user to put foods in the refrigerating chamber R is installed, the duct 170 and the shelf 155b do not interfere with each other. The space formed between the shelf 155b and the inner casing 152c of the refrigerating chamber R to circulate cool air in the conventional direct cooling type refrigerator can be used as the cool air circulation passage A, thereby preventing reduction of an inside capacity of the refrigerating chamber R.

Here, the duct 170 is formed in a plate shape covering one entire surface of the inner casing 152c of the refrigerating chamber R. The duct 170 has a suction hole at its upper end, and also has a plurality of cool air distribution holes 170h at the lower portion of the suction hole at predetermined intervals. Preferably, the cool air distribution holes 170h are increased in size from the upper to lower portion of the duct 170, but can be formed in the same size.

A predetermined thickness of insulation material 172 is adhered to the rear surface of the duct 170, for preventing moisture of the air of the refrigerating chamber R from being condensed on the front surface of the duct 170 due to the cool air flowing along the cool air circulation passage A. A drain pipe (not shown) for externally guiding condensed water, and a drain fan (not shown) for collecting the condensed water are installed at the lower end of the duct 170.

Especially, the duct 170 is structurally mounted on the inner wall of the refrigerating chamber R by a structural coupling means such as uneven units. For example, the structural coupling means includes guide rails 192 formed long in the up/down direction at both ends of the rear surface of the duct 170, and guide protrusions 194 protruded long in the up/down direction from the refrigerating chamber side inner casing 152c to be coupled to the guide rails 192 of the duct 170. Also, the structural coupling means can be modified in various forms.

The air blowing device 180 includes a blast fan 182 for blowing the cool air circulated in the refrigerating chamber R to the cool air circulation passage A, a motor 184 for driving the blast fan 182, and a fan housing 186 in which the blast fan 182 and the motor 184 are installed. Here, the fan housing 186 is mounted on the suction hole of the duct 170, and the motor 184 is connected to the control unit 164 by an electrical coupling means. The control unit 164 controls the operation of the blast fan 182 by turning on/off power supplied to the motor 184.

Here, the electrical coupling means includes connectors 196 and 198 connected respectively to the motor 184 and the control unit 164 through electric wires. The connector 198 of the control unit 164 is fixedly installed on the top surface of the refrigerating chamber side inner casing 152c, and the connector 196 of the motor 184 is coupled to the connector 198 of the control unit 164, for transmitting control signals and electric signals such as power.

The control unit 164 is connected to various components such as the temperature sensors, the compressor 156, and the motor 184 for driving the blast fan 182, for controlling the operations of the components. The control unit 164 controls each component so that temperatures measured in the freezing chamber F and the refrigerating chamber R by the temperature sensors can reach a set freezing temperature range and a set refrigerating temperature range decided by externally-inputted set freezing temperature $Tf_0$ and set refrigerating temperature $Tr_0$. Especially, the control unit 164 selectively performs direct cooling and indirect cooling in the refrigerating chamber R by connection or disconnection of the duct 170 and the air blowing device 180.

When the connector 196 of the motor 184 is not connected to the connector 198 of the control unit 164, the control unit 164 performs direct cooling according to a previously-inputted direct cooling control program, and when the connector 196 of the motor 184 is connected to the connector 198 of the control unit 164, the control unit 164 performs indirect cooling according to a previously-inputted indirect cooling control program.

The direct cooling control compares the externally-inputted set refrigerating temperature $Tr_0$ with the temperature inputted from the temperature sensor, and controls the operation of the compressor 156, thereby controlling cooling capability according to a refrigerant compression capacity. The indirect cooling control compares the externally-inputted set refrigerating temperature $Tr_0$ with the temperature inputted from the temperature sensor, and controls the operations of the compressor 156 and the motor 184, thereby controlling cooling capability according to a refrigerant compression capacity and a cool air circulation amount.

In the case that the temperature of the refrigerating chamber R is over a maximum temperature $Tr_M$ of the set refrigerating temperature range during the indirect cooling control, the control unit 164 performs a refrigerating operation by operating the compressor 156 and rotating the blast fan 182 at a first rotary speed, and when the temperature of the refrigerating chamber R is below a minimum temperature $Tr_m$ of the set refrigerating temperature range, the control unit 164 performs a defrosting operation for melting the frost formed on the surface of the refrigerating chamber side evaporator 160b, by stopping the compressor 156 so that relatively high temperature refrigerants can pass through the refrigerating chamber side evaporator 156b, and by rotating the blast fan 182 at a second rotary speed higher than the first rotary speed so that relatively high temperature air can be circulated.

As discussed earlier, in accordance with the present invention, the refrigerator easily converts the refrigerating chamber to direct cooling or indirect cooling and uniformly cools the refrigerating chamber, by performing direct cooling by naturally convecting the cool air in the freezing chamber, and performing indirect cooling by forcibly blowing the cool air by mounting the duct and the air blowing device to be structurally electrically connected in the refrigerating chamber.

As compared with the conventional direct cooling type refrigerator, the refrigerator does not reduce the inside capacity of the refrigerating chamber, by forming the cool air circulation groove on the inner wall of the refrigerating chamber, or mounting the duct and the air blowing device in the air circulation space at the rear end of the shelf.

In addition, the cool air circulation passage is formed by installing the duct inside the refrigerating chamber, the refrigerating chamber side evaporator is built in the inner wall of the refrigerating chamber facing the cool air circulation passage, and the insulation material is adhered to the inside surface of the duct. Therefore, the refrigerator prevents the condensed water from being formed on the outside surface of the duct, namely the exposed part to the refrigerating chamber, and maintains the sanitary state, by obtaining insulation effects, even though the cool air is circulated along the cool air circulation passage.

When the frost is formed on the cool air circulation passage, the refrigerator performs the defrosting operation by stopping the compressor and rotating the blast fan faster. Accordingly, the refrigerator does not need components such as a defrosting heater, and prevents increase of energy loss and temperature of the refrigerating chamber, which results in high cooling efficiency.

Moreover, the refrigerator varies the thickness of the insulation material adhered to the inside surface of the duct composing part of the cool air circulation passage, or inclines the inner wall of the refrigerating chamber composing the other part of the cool air circulation passage. Even if the frost is formed on the cool air circulation passage, the refrigerator guarantees cooling performance by obtaining a predetermined cool air circulation passage.

The refrigerator minimizes the suction flow resistance by mounting the space-obtaining protrusion units or the space-obtaining cover on the suction hole of the cool air circulation passage to obtain a predetermined flowing space. As a result, the refrigerator guarantees cooling performance by preventing reduction of the cool air circulation amount.

Although the preferred embodiments of the present invention have been described, it is understood that the present invention should not be limited to these preferred embodiments but various changes and modifications can be made by one skilled in the art within the spirit and scope of the present invention as hereinafter claimed.

What is claimed is:

1. A refrigerator, comprising:
a refrigerator main body in which a freezing chamber and a refrigerating chamber are formed to be partitioned;
a freezing chamber side evaporator installed at the freezing chamber, for directly cooling the freezing chamber;
a refrigerating chamber side evaporator installed in direct contact on a rear surface of an inner wall of the refrigerating chamber, for cooling the refrigerating chamber;
a refrigeration cycle including a compressor, a condenser and an expansion means connected to the freezing chamber side evaporator and the refrigerating chamber side evaporator, and performing a cooling operation around the evaporators by circulating refrigerants;
a duct being installed on a front surface of the inner wall of the refrigerating chamber to form a cool air circulation passage in an up/down direction, having a suction hole at its one end, and having a plurality of cool air distribution holes at its other side of the suction hole for distributing cool air to the refrigerating chamber;
an air blowing device installed at the suction hole of the duct, for blowing the air circulated in the refrigerating chamber to pass through the cool air circulation passage; and
a control unit for naturally or forcibly convecting the cool air in the refrigerating chamber by controlling operations of various components including the compressor and the air blowing device.

2. The refrigerator of claim 1, wherein the freezing chamber side evaporator is built in a shelf partitioning spaces of the freezing chamber.

3. The refrigerator of claim 1, wherein the refrigerating chamber side evaporator is built in to directly contact part of the inner wall of the refrigerating chamber, a cool air circulation groove is formed in the up/down longitudinal direction at the built-in part of the refrigerating chamber side evaporator on the inner wall of the refrigerating chamber, and the duct is installed at the cool air circulation groove to form the same plane surface with the inner wall of the refrigerating chamber.

4. The refrigerator of claim 3, wherein the suction hole is formed at the upper end of the duct, and the plurality of cool air distribution holes are formed at the lower portion of the suction hole at predetermined intervals, so that the cool air can flow from the upper to lower end of the cool air circulation passage, and the air blowing device is installed at the suction hole of the duct.

5. The refrigerator of claim 4, wherein a drain pipe is connected to the lower end of the duct, so that condensed water running down the cool air circulation passage can be externally guided and discharged.

6. The refrigerator of claim 1, wherein an insulation material is installed on the inside surface of the duct contacting the cool air circulation passage to prevent dew from being formed on the outside surface of the duct contacting the refrigerating chamber.

7. The refrigerator of claim 6, wherein a thickness of the insulation material is reduced from the lower to upper end in order to obtain a predetermined flowing space in which the cool air can flow, even though frost is formed thick at the upper end of the inner wall of the refrigerating chamber on the cool air circulation passage.

8. The refrigerator of claim 6, wherein the cool air circulation groove is inclined from the lower to upper end in order to obtain a predetermined flowing space in which the cool air can flow, even though frost is formed thick at the upper end of the inner wall of the refrigerating chamber on the cool air circulation passage.

9. The refrigerator of claim 4, wherein the cool air distribution holes of the duct are increased in size from the upper to lower end of the duct to uniformly distribute the cool air.

10. The refrigerator of claim 1, wherein the air blowing device comprises a blast fan for blowing cool air, a motor, and a fan housing installed at the suction hole of the duct, the blast fan and the motor being built in the fan housing.

11. The refrigerator of claim 10, wherein space-obtaining protrusion units are protruded from the front end of the fan housing by a predetermined length, for obtaining a predetermined flowing space at the front end.

12. The refrigerator of claim 11, wherein the length of the space-obtaining protrusion units ranges from 15 to 25% of the diameter of the blast fan.

13. The refrigerator of claim 10, wherein a space-obtaining cover is protruded from the front end of the fan housing by a predetermined length in order to obtain a predetermined flowing space at the front end, and a plurality of suction holes are formed on the space-obtaining cover.

14. The refrigerator of claim 13, wherein the protrusion length of the space-obtaining cover ranges from 10 to 50% of the diameter of the blast fan.

15. The refrigerator of claim 10, wherein, when a temperature of the refrigerating chamber is over a maximum temperature of the set refrigerating temperature range, the control unit performs a refrigerating operation by operating the compressor and rotating the blast fan at a first rotary speed, and when the temperature of the refrigerating chamber is below a minimum temperature of the set refrigerating temperature range, the control unit performs a defrosting operation by stopping the compressor and rotating the blast fan at a second rotary speed higher than the first rotary speed.

16. A refrigerator, comprising:
a refrigerator main body in which a freezing chamber and a refrigerating chamber are formed to be partitioned;
a freezing chamber side evaporator installed at the freezing chamber, for directly cooling the freezing chamber;
a refrigerating chamber side evaporator installed on a rear surface of an inner wall of the refrigerating chamber, for cooling the refrigerating chamber;
a refrigeration cycle including a compressor, a condenser and an expansion means connected to the freezing chamber side evaporator and the refrigerating chamber side evaporator, and performing a cooling operation around the evaporators by circulating refrigerants;
a cool air circulating means detachably installed to form a cool air circulation passage in an up/down direction on a front surface of the inner wall of the refrigerating chamber, for circulating cool air generated on the cool air circulation passage in the refrigerating chamber;
a coupling means installed between the inner wall of the refrigerating chamber and the cool air circulating means, for structurally and electrically coupling the cool air circulating means to the inner wall of the refrigerating chamber; and
a control unit for naturally or forcibly convecting the cool air in the refrigerating chamber by controlling operations of various components including the compressor and the cool air circulating means.

17. The refrigerator of claim 16, wherein the freezing chamber side evaporator is built in a shelf partitioning spaces of the freezing chamber.

18. The refrigerator of claim 16, wherein the refrigerating chamber side evaporator is built in to directly contact the whole inner wall of the rear surface of the refrigerating chamber.

19. The refrigerator of claim 18, wherein the cool air circulating means comprises:
   a duct being installed on the inner wall of the refrigerating chamber with a predetermined gap to form a cool air circulation passage, having a suction hole at its one end, and having a plurality of cool air distribution holes at its other side of the suction hole to distribute the cool air to the refrigerating chamber; and
   an air blowing device installed at the suction hole of the duct, for blowing the air circulated in the refrigerating chamber to pass through the cool air circulation passage.

20. The refrigerator of claim 19, wherein the suction hole is formed at the upper end of the duct, and the plurality of cool air distribution holes are formed at the lower portion of the suction hole at predetermined intervals, so that the cool air can flow from the upper to lower end of the cool air circulation passage, and the air blowing device is installed at the suction hole of the duct.

21. The refrigerator of claim 20, wherein a drain pipe is connected to the lower end of the duct, so that condensed water running down the cool air circulation passage can be externally guided and discharged.

22. The refrigerator of claim 16, wherein an insulation material is installed on the inside surface of the duct contacting the cool air circulation passage to prevent dew from being formed on the outside surface of the duct contacting the refrigerating chamber.

23. The refrigerator of claim 22, wherein a thickness of the insulation material is reduced from the lower to upper end in order to obtain a predetermined flowing space in which the cool air can flow, even though frost is formed thick at the upper end of the inner wall of the refrigerating chamber on the cool air circulation passage.

24. The refrigerator of claim 22, wherein the inner wall of the rear surface of the refrigerating chamber is inclined from the lower to upper end in order to obtain a predetermined flowing space in which the cool air can flow, even though frost is formed thick at the upper end of the inner wall of the refrigerating chamber on the cool air circulation passage.

25. The refrigerator of claim 20, wherein the cool air distribution holes of the duct are increased in size from the upper to lower end of the duct to uniformly distribute the cool air.

26. The refrigerator of claim 19, wherein the air blowing device comprises a blast fan for blowing cool air, a motor, and a fan housing installed at the suction hole of the duct, the blast fan and the motor being built in the fan housing.

27. The refrigerator of claim 26, wherein space-obtaining protrusion units are protruded from the front end of the fan housing by a predetermined length, for obtaining a predetermined flowing space at the front end.

28. The refrigerator of claim 27, wherein the length of the space-obtaining protrusion units ranges from 15 to 25% of the diameter of the blast fan.

29. The refrigerator of claim 26, wherein a space-obtaining cover is protruded from the front end of the fan housing by a predetermined length in order to obtain a predetermined flowing space at the front end, and a plurality of suction holes are formed on the space-obtaining cover.

30. The refrigerator of claim 29, wherein the protrusion length of the space-obtaining cover ranges from 10 to 50% of the diameter of the blast fan.

31. The refrigerator of claim 26, wherein the coupling means comprises connectors electrically connected between the blast fan and the motor and the control unit, respectively, for transmitting control signals and power to each other.

32. The refrigerator of claim 31, wherein the coupling means comprises uneven units formed respectively at the contact portions of both ends of the inner wall of the refrigerating chamber and both ends of the duct, and structurally coupled to each other.

33. The refrigerator of claim 31, wherein the control unit selectively performs direct cooling control and indirect cooling control on various components by connection or disconnection of the connectors.

34. The refrigerator of claim 33, wherein, when the connectors are not connected to each other, the control unit performs direct cooling control for controlling the compressor, and when the connectors are connected to each other, the control unit performs indirect cooling control for controlling the compressor and the blast fan.

35. The refrigerator of claim 34, wherein, when a temperature of the refrigerating chamber is over a maximum temperature of the set temperature range during the indirect cooling control, the control unit performs a refrigerating operation by operating the compressor and rotating the blast fan at a first rotary speed, and when the temperature of the refrigerating chamber is below a minimum temperature of the set temperature range, the control unit performs a defrosting operation by stopping the compressor and rotating the blast fan at a second rotary speed higher than the first rotary speed.

* * * * *